(12) United States Patent
Rainer

(10) Patent No.: US 7,381,333 B1
(45) Date of Patent: Jun. 3, 2008

(54) TREATMENT OF WATER FLOWING IN A HORIZONTAL CONDUIT

(76) Inventor: Norman B. Rainer, 2008 Fondulac Rd., Richmond, VA (US) 23229

( * ) Notice: Subject to any disclaimer, the term of this patent is extended or adjusted under 35 U.S.C. 154(b) by 0 days.

(21) Appl. No.: 11/974,592

(22) Filed: Oct. 16, 2007

Related U.S. Application Data

(60) Provisional application No. 60/852,576, filed on Oct. 19, 2006.

(51) Int. Cl.
*B01D 33/00* (2006.01)
(52) U.S. Cl. .................. 210/660; 210/661; 210/679; 210/681
(58) Field of Classification Search .............. 210/660, 210/661, 679, 681, 690–691
See application file for complete search history.

(56) References Cited

U.S. PATENT DOCUMENTS

| | | | |
|---|---|---|---|
| 4,925,564 A | * | 5/1990 | Francis ................... 210/608 |
| 5,770,079 A | * | 6/1998 | Haase .................... 210/606 |
| 5,885,446 A | * | 3/1999 | McGrew, Jr. ............ 210/91 |
| 6,099,723 A | * | 8/2000 | Morris et al. ........ 210/170.03 |
| 6,106,707 A | * | 8/2000 | Morris et al. ........... 210/163 |
| 6,406,218 B1 | * | 6/2002 | Olson .................... 405/36 |
| 6,428,701 B1 | * | 8/2002 | Mullennix et al. ...... 210/606 |
| 6,521,340 B2 | | 2/2003 | Rainer |
| 2003/0034286 A1 | * | 2/2003 | Butler .................. 210/163 |

* cited by examiner

*Primary Examiner*—Chester T Barry
(74) *Attorney, Agent, or Firm*—Norman Rainer

(57) ABSTRACT

Trace levels of dissolved toxic species are removed from water flowing horizontally in a conduit equipped with overhead debris-excluding structure by suspending from the overhead structure elongated absorbent structures in the form of porous bags which confine particulate absorption material. The bags are free to swing upwardly in the downstream direction in response to heavy water flows, thereby avoiding blockage of the conduit.

6 Claims, 2 Drawing Sheets

FIG. 4A    FIG. 4B

TREATMENT OF WATER FLOWING IN A HORIZONTAL CONDUIT

BACKGROUND APPLICATIONS

This Application claims the benefit of U.S. Provisional Application Ser. No. 60/852,576, Filed Oct. 19, 2006, which is hereby incorporated by reference in it entirety.

BACKGROUND OF THE INVENTION

1. Field of the Invention

This invention relates to the treatment of water flowing substantially horizontally in conduits such as troughs, trenches and culverts, and more particularly concerns a method and apparatus for the selective removal of trace levels of dissolved species from horizontally confined streams of flowing water.

2. Description of the Prior Art

Stormwaters, as produced by rainfall and flooding contain various suspended and dissolved species. Numerous systems, generally employing filtration and sedimentation techniques, have been employed to remove from stormwater suspended soil and immiscible oily substances.

Although filtration mechanisms function rapidly, the necessary filtration media imposes a high impedance to flow, thereby requiring a very large cross-sectional area of contact with the water. Also, the material that accumulates on the filter media must be periodically removed.

Sedimentation techniques for the removal of suspended soil are slow, and generally involve the use of large holding systems such as above ground lagoons or underground chambers. In municipalities having paved streets and parking lots, receptacles that collect stormwater are usually located at street level, and these are often associated with troughs or underground conduits which convey the water substantially horizontally toward a disposal destination. Said troughs and equivalent conduits are generally equipped with overhead grates to prevent ingress of debris. Underground conduits are generally provided with vertical manhole passages that facilitate inspection, maintenance and clean-out.

The dissolved species in stormwater generally make their way to rivers, streams, groundwater, and eventually drinking water. Such dissolved species include innocuous cationic forms of metals such as sodium, potassium, calcium, magnesium, and aluminum, and innocuous anionic species such as chloride, sulfate, phosphate and carbonate. However, toxic organic and inorganic species may also be present, generally at low concentrations below about 3 parts per million. The organic species are generally of agricultural origin, such as herbicides, fungicides and insecticides. The toxic inorganic species, often originating from industrial waste and geological sources, may include mercury, cadmium, lead, chromium, nickel, copper, arsenic, zinc, vanadium, and others. Such toxic inorganic species generally produce human illnesses when consumed in drinking water at concentrations even below 1 part per million.

Techniques for removing trace levels of dissolved species from water include precipitative methods, semi-permeable membranes and granular selective absorbents such as activated carbon and ion exchange resins. Because said precipitative and semi-permeable membrane technologies involve large, multi-component complex facilities requiring careful monitoring and control, they are not useful in treating stormwater unless the stormwater is collected and processed at a municipal wastewater treatment facility. Selective absorbents can in theory be employed as passive beds placed to intercept large or small stormwater flows. However, the impedance to the flow of water through such beds is so high that it blocks passage of stormwater. If the path length of the flow through the bed is minimized so as to reduce impedance, then there is insufficient contact time for the bed to absorb dissolved species. The aforesaid problems apply not only to stormwater but also to the discharge of industrial wastewater.

With respect to the removal of trace levels of dissolved toxic inorganic species, there is the further requirement that the absorbent is selective for the toxic species. Otherwise, the absorbent would quickly saturate with the aforesaid abundant innocuous species.

It is accordingly an object of the present invention to provide a method for removing dissolved toxic species from water flowing in a horizontal conduit.

It is a further object of this invention to provide a method as in the foregoing object which is of a passive nature, namely operative in an unattended manner based upon gravity-impelled flow of water.

It is another object of the present invention to provide a method of the aforesaid nature particularly suited for the treatment of stormwater that is flowing substantially horizontally.

It is a still further object of this invention to provide an absorbent structure useful in the aforesaid method.

These objects and other objects and advantages of the invention will be apparent from the following description.

SUMMARY OF THE INVENTION

The above and other beneficial objects and advantages are accomplished in accordance with the present invention by a method for removing dissolved species from water flowing substantially horizontally in conduit means having a bottom surface and debris-excluding overhead structure, said method comprising pendently suspending from said overhead structure elongated porous containers confining particulate absorption material, said containers having a pore size small enough to retain said particulate material, yet large enough to permit entrance and egress of water, and having a length extending between a lower extremity positioned above said bottom surface, and an upper extremity which releasibly attaches to said overhead structure to permit swinging movement of said containers in a downstream direction, the extent of said movement being proportional to the force of the water acting against said containers.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIGS. 4A, 4B and 4C are fragmentary top views illustrating various placement patterns of said containers within said trough.

Figure 1:
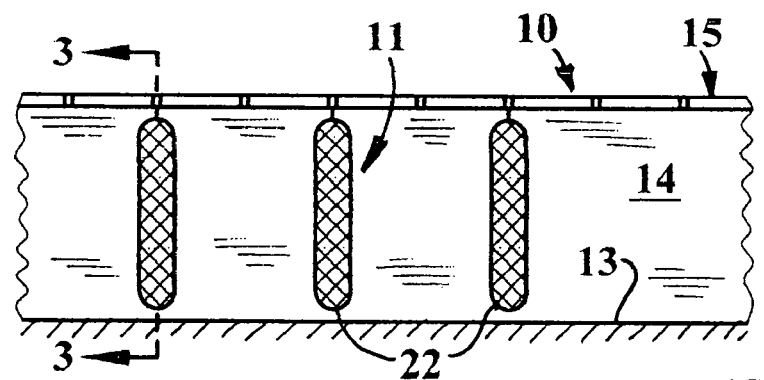
FIG. 1 is a fragmentary side view exemplifying the placement of absorbent-filled containers of this invention within a substantially horizontal trough that conveys water, and illustrates the empty, no-flow state of the trough.

DESCRIPTION OF THE PREFERRED
EMBODIMENTS

Referring now to FIGS. 1-5, embodiments of the method of this invention are shown involving laterally extending conduits such as trench or trough means 10 having suspended therein absorbent structures 11.

Trough means 10 extends downwardly into the ambient terrain 12 and is bounded by bottom surface 13 and opposed sidewall surfaces 14. The upper extremity 34 of trough means 10 is shown equipped with debris-excluding overhead structure in the form of grate 15 positioned at the surface level 35 of said terrain. The height of the trough means may range from about ten inches to several feet. Likewise, the width of the trough means, measured between sidewall surfaces 14 may range from about ten inches to several feet. Bottom surface 13, although substantially horizontally oriented, has sufficient lateral drop to facilitate gravity induced conveyance of water toward an ultimate disposal site. The illustrated grate is provided with a multiplicity of apertures 16 having effective diameters between about ¼ inch and one inch. In alternative embodiments, upper extremity 34 may be located below said surface level, and communicating with a series of vertical conduits which extend to overhead grates or manhole covers at said surface level.

Absorbent structures 11 are exemplified as elongated containers 18 bounded by a porous enveloping wall 19 which confines a bed of particulate absorption material 30. Said containers extend between top end 21 and bottom end 22, and are preferably of circular cylindrical sausage-like contour having a diameter between about 1½ and 6 inches. The containers are preferably compliant bags fabricated of durable synthetic fiber, and have a pore or mesh size between about 300 and 700 microns. Such range of mesh size corresponds to U.S. Standard Sieve Series size designations between about 50 and 25, respectively.

Figure 2:
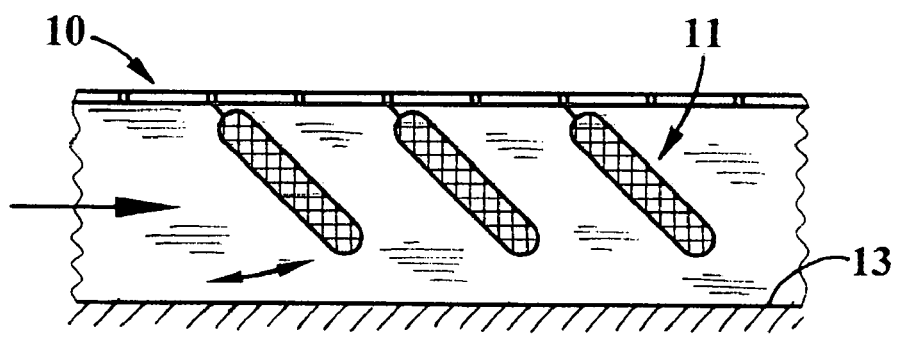
FIG. 2 is a view similar to FIG. 1 showing the trough and containers during a high flow of water.

At least one end of said bags is provided with openable closure means 24, and top end 21 is provided with hanging means 25. In a preferred embodiment, the function of said closure means and hanging means is achieved by a drawstring 26. Each bag of absorbent is suspended from the upper extremity 34 of said trough means, such as by grate 15 in a manner causing bottom end 22 to be located above bottom surface 13 of said trough means. As shown in FIG. 2, such manner of positioning enables the absorbent structures to be swung upwardly in the downstream direction by virtue of the force exerted by a strong flow of water.

Figure 3:
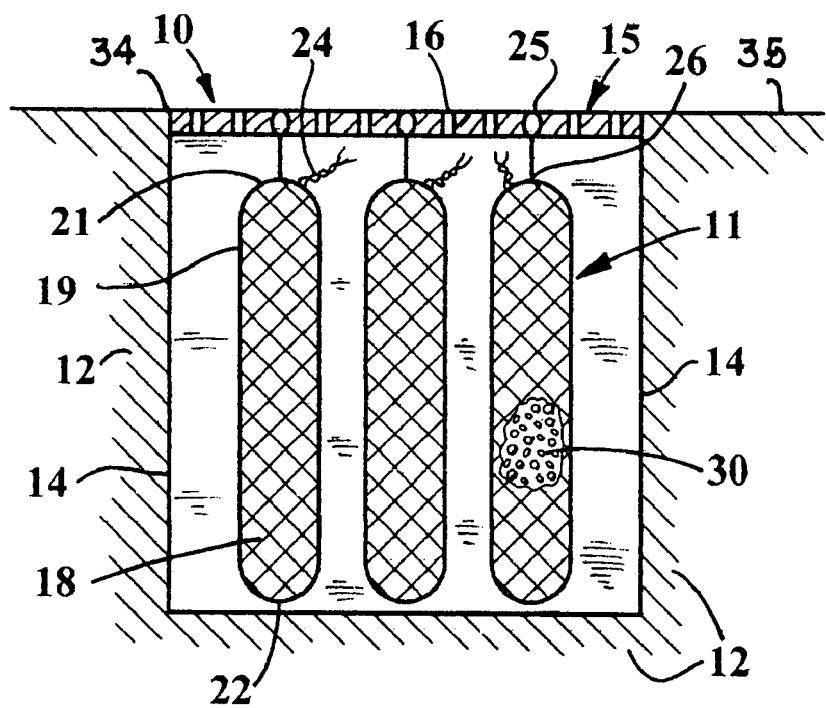
FIG. 3 is a sectional view taken in the direction of the arrows upon the line 3-3 of FIG. 1, with a portion broken away.

In preferred embodiments, such as shown in FIGS. 3, 4A and 4B, several absorbent structures are deployed side by side transversely to the flow of water. In such instances, the several absorbent structures constitute a swinging curtain which functions in valve-like manner to avoid blockage of the trough means during periods of heavy flow.

The particulate absorbent material may be of granular or bead-like shape, having a particle size larger than the pores of containers 18. Some embodiments of particulate absorbent materials may have large, irregular shapes, particularly when derived from naturally occurring materials such as soy hulls, peanut shells and tobacco stems. However, at least one dimension of such materials will have a thickness less than about 3 millimeters.

Granular activated carbon is employed when it is sought to remove dissolved organic species from the water. When it is sought to remove toxic inorganic species, selective ion exchange substances are employed having strong affinity for transition group heavy metal ions capable of multiple valence states. Suitable selective ion exchange substances include Resin Tech SIR-200, a bead form chelating resin marketed by Resin Tech Inc., of Cherry Hill, N.J.; and FORAGER Type M-TU, a granular complexing resin marketed by Dynaphore, Inc. of Richmond, Va. Other particulate absorbents for metals removal include zeolites and chemically modified carbohydrate substances such as soy hulls and tobacco stems. Inert spacer particles can be interspersed within the bed of absorbent to reduce impedance to water flow through the bed.

Preferred ion exchange absorbent substances are those which are reasonably resistant to mechanical degradation by virtue of cycling between wet and dry states. It is also important that the absorbent is fast-acting. In particular it is preferred to employ absorbents which, when tested in a laboratory column, are capable of producing at least 75% removal of selected metal ions within a 2 minute contact time. It is further preferred to employ absorbent substances which, when tested at equilibrium conditions in a stirred beaker or static column evaluation, display a removal capability greater than 90%. Preferred ion exchange substances are capable of selectively absorbing trace levels of toxic heavy metal species from waters containing at least a hundred times greater concentration of dissolved innocuous species. A further requirement of preferred absorbent particles is that they are capable of absorbing, at saturation, at least 1.5% by weight of toxic metal species. Saturation values can range as high as 12% metal content based upon the dry weight of absorbent.

In actual use in treating stormwater, the resins will not perform as well as in laboratory testing because of the very short duration of contact time and the fact that only a portion of the stormwater flow goes directly through the bed of resin confined within the bags. However, by suitably positioning a number of absorbent structures in the path of the stormwater in the aforesaid manner, significant reductions can be achieved in toxic heavy metal concentrations without impairing the general function of the conduit means. When the absorbent material becomes saturated, it is removed from the bags and replaced with fresh material. Access to the bags is achieved by temporarily lifting a grate or manhole cover interactive with the upper extremity 34 of said conduit means.

EXAMPLE 1

A quantity of particulate selective absorbent material was prepared by soaking soybean hulls in an aqueous solution containing 3% polyethyleneimine (molecular weight 1800). The hulls were then removed, drained of clinging solution, and placed in an oven at 340° F. for 45 minutes. The treated dry hulls were sieved to remove sub-20 mesh fines.

The treated hulls were loaded into bags of circular cylindrical contour fabricated of polyester fiber, and having a mesh size of 700 microns (equivalent to a 25 mesh screen in the U.S. Sieve Series). The bags have a height of 28 inches, and a diameter of 5 inches. The bags are closed at their lower extremity and closed, after filling, at their upper extremity by way of a drawstring.

Tether lines were attached to the upper extremities of the bags and the absorbent-filled bags were suspended from ground level manhole covers, through the associated manhole, and into an underground stormwater receiving conduit such as disclosed in U.S. Pat. No. 6,994,490 which is incorporated herein by reference. The lower extremities of the bags were caused to be positioned about 2 inches above the ground level within the conduit.

After about one year of on-line service within the conduit, the bags were retrieved. The soybean hulls were washed free of clinging sediment, dried, ashed, and analyzed for metals content via ICP methodology (inductively coupled plasma). It was found that the treated hulls had absorbed 2.3% by weight of metals comprised of mercury, lead, cadmium, copper, chromium, zinc, vanadium and arsenic, all trace level toxic species.

Figure 4C:
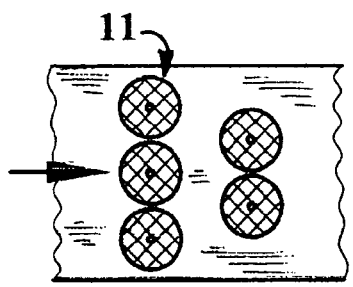
Figure 4C:
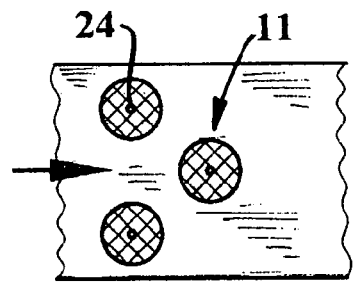
Figure 4C:
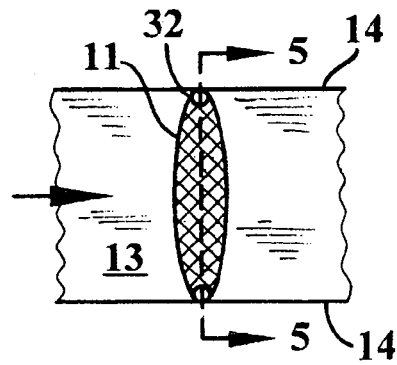
Figure 5:
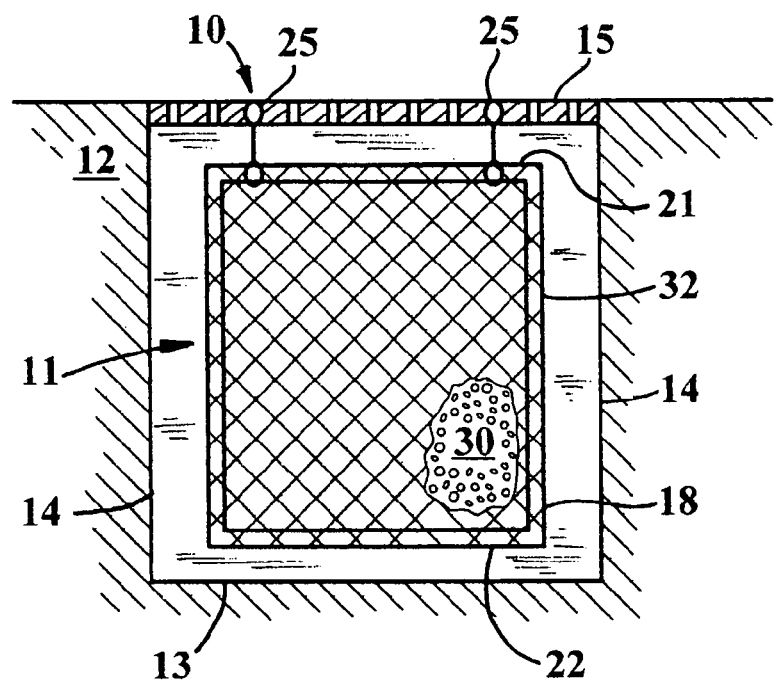
FIG. 5 is a sectional view taken in the direction of the arrows upon the line 5-5 of FIG. 4C.

The re-filling of the bags may be accomplished by use of a removably inserted funnel. Alternatively, an insert frame member 32 may be positioned within the bag, as shown in FIGS. 4c and 5. Said frame member not only facilitates re-filling of the bag, but produces a pillow-like cross-sectional configuration which more efficiently contacts the flowing water.

The water treatment methodology of the present invention is also useful in treating horizontally confined streams of water other than stormwater. In particular, the method may be applied to mining effluents and other industrially generated waste streams, particularly those containing a high level of suspended matter and not otherwise amenable to treatment by existing methods.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A method for removing dissolved species from water flowing substantially horizontally in conduit means having opposed side walls, a bottom surface and debris-excluding overhead structure, said method comprising pendently suspending from said overhead structure elongated porous containers confining particulate absorption material, said containers having a pore size small enough to retain said particulate material, yet large enough to permit entrance and egress of water, and having a length extending between a lower extremity positioned above said bottom surface, and an upper extremity which releasibly attaches to said overhead structure and permits swinging movement of said containers in a downstream direction, the extent of said movement being proportional to the force of said water acting against said containers.

2. The method of claim 1 wherein said water is stormwater.

3. The method of claim 2 wherein said dissolved species are inorganic and are present at concentrations below about 3 parts per million.

4. The method of claim 2 wherein said containers are comprised of fabric made from durable synthetic fibers.

5. The method of claim 4 wherein said containers have a circular cross-sectional configuration.

6. The method of claim 5 wherein several of said containers are deployed side by side between said side walls to form a swingable curtain transversely oriented to the flow of said water.

* * * * *